April 29, 1952 W. J. BOOS 2,594,857
SLIDE RULE
Filed Jan. 5, 1949
FIG. 1.
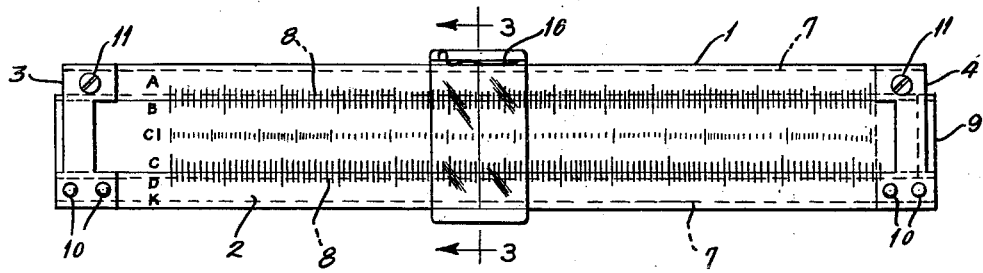
FIG. 2.
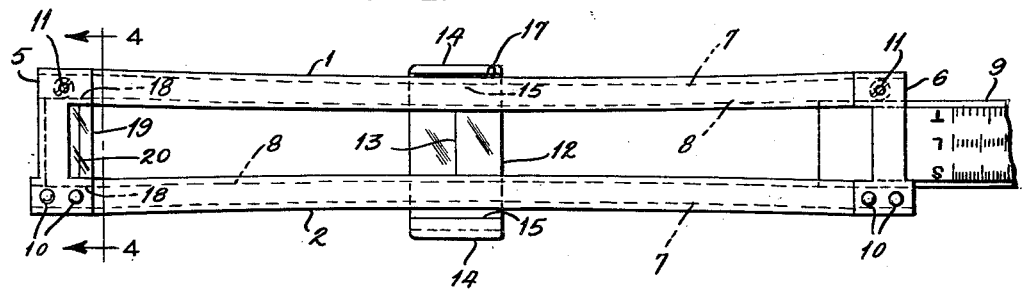
FIG. 3. FIG. 4.
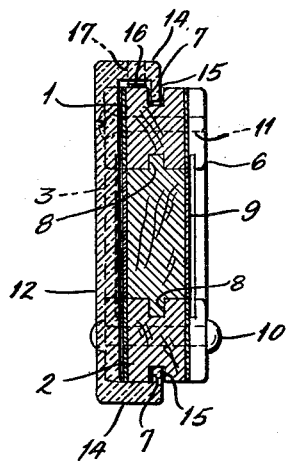 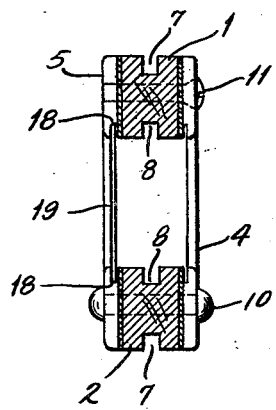
INVENTOR:
WILFRED J. BOOS
BY Brunings and Sutherland
ATTORNEYS.

# UNITED STATES PATENT OFFICE 2,594,857

SLIDE RULE

Wilfred J. Boos, Clayton, Mo., assignor to Acu-Rule Manufacturing Company, St. Louis, Mo., a corporation of Missouri Application January 5, 1949, Serial No. 69,278

2 Claims. (Cl. 235—70)

This invention pertains to slide rules such as are used for mathematical computations.

One of the objects of this invention is to provide improved construction for such a rule adapted to facilitate the assembly thereof.

Another object is to provide an improved one-piece cursor and simple means for mounting the same on the rule.

Another object is to provide an improved index for scales on the rear face of the slide.

Further objects will appear from the following description, taken in connection with the accompanying drawing, in which will be set forth an illustrative embodiment of this invention. It is understood, however, that the invention is susceptible of various embodiments, within the scope of the appended claims, without departing from the principles or spirit of the invention.

In the accompanying drawing:

Figure 1 is a front-face view of a slide rule embodying this invention;

Figure 2 is a rear view (turned end-for-end relatively to Figure 1) with the slide withdrawn and the side bars sprung to release the cursor;

Figure 3 is an enlarged section on line 3—3 of Figure 1; and

Figure 4 is a similar section on line 4—4 of Figure 2.

Referring now to the drawing, 1 and 2 designate, respectively, the upper and lower side bars of a slide rule of the duplex type. The bars 1 and 2 are connected and held in spaced relation by end brackets 3 and 4 on the front face of the rule and similar brackets 5 and 6 on the rear face thereof. The bars 1 and 2 are provided with grooves 7 along their outer edges and similar grooves 8 along their inner edges, in the latter of which the slide 9 is adapted to move. The end brackets are fixed to the lower bar 2 by rivets 10, while clamp screws 11 pass through oversized holes in the upper bar 1 to permit relative adjustment of the bars 1 and 2 in case of misalignment of the scales thereon. The screws 11 are threaded into brackets 5 and 6.

A cursor 12 is formed of a single piece of transparent plastic or similar material to provide a flat transparent pane overlying the front face of the rule. This pane is provided on its inner face with an index line 13 traversing the computing scales on the front of the side bars and the slide. These may be the usual scales A, B, C, D, etc., or any other scales suitable to the computations for which the rule is intended. The upper and lower ends of the cursor are formed to provide slide blocks 14 adapted for sliding engagement with the outer edges of the side bars. The slide blocks have formed thereon tongues 15 engageable in the grooves 7, as shown in Figure 3, to retain the cursor on the rule and guide its movement therealong. One of the slide blocks may be provided, within the space between the tongue 15 and the rear of the pane, with a leaf spring 16 bearing upon the outer edge of the side bar and retained in place by any suitable means, as by tucking a U-bend at its end into a recess in the slide block, as indicated at 17 in Figure 2. In order to assemble the cursor on the rule, the slide 9 may be withdrawn, as shown in Figure 2, after which the side bars 1 and 2 may be bowed toward each other until one of the tongues 15 will clear the outer edge of one side bar while the other tongue is in the groove 7 of the other side bar, as is also shown in Figure 2. In this way the tongue is passed over the edge of the side bar and inserted into the groove 7 therein and the bars allowed to spring back straight. The cursor may be removed by similar procedure. When the slide 9 is then pushed in between the side bars the cursor is made secure against removal.

As the slide 9 is provided with one or more computing scales S, L, T, on its rear face, and it is often desirable to use such scales in combination with the scales on the front face of the rule, an index is provided for the rear scales. One of the end brackets (in Figures 2 and 4, the bracket 5) is formed on its under face with a recess 18 adapted to receive a transparent pane 19, of plastic or the like, which may be cemented or otherwise secured to the bracket in said recess. The recess is slightly deeper than the thickness of the pane, and a film of cement is interposed between the pane 19 and the portions of bars 1 and 2 overlapped thereby, so that the pane will not contact the face of the slide 9. The inner face of the pane 19 is marked with an index line 20 for reading the scales on the rear face of the slide.

In accordance with this invention, in order to promote accuracy in locating the index line 20, the pane 19 is assembled without said line and the line is printed on the pane after the side bars have been assembled on the end brackets. For this purpose, the side bar and end bracket assembly (with the slide 9 withdrawn) is placed face up in operative relation to suitable marking means, such as a printing die. In this position the assembly may be accurately located with relation to the marking means by reference to the scale or scales on the front of the side bars.

When so located, the marking means may be operated to mark the line 20 on the inner face of the pane 19 and said line will then be accurately placed with reference to the scales on the front of the side bars.

It will be seen, therefore, that this invention provides a slide rule of simple construction, which may be made at low cost, and a method whereby accuracy in coordinating scales on opposite faces may be obtained in a simple manner.

Having thus described the invention, what is claimed and desired to be secured by Letters Patent is:

1. In a slide rule of the character described, having a pair of parallel spaced side bars, the outer edge of each of said bars having a groove extending lengthwise thereof, end brackets connecting said side bars and supporting the same in spaced relation, a slide movable between said side bars, and a cursor provided at its opposite sides with tongues extending toward each other and receivable within the grooves of said side bars to retain said cursor thereon, the improvement which comprises said side bars being flexible for limited bowing toward each other when the slide is removed from therebetween, and one of said tongues extending into its groove for a distance no greater than the relative movement between said side bars when bowed toward each other whereby the cursor is removable from the side bars when the slide is withdrawn from between the side bars, but said cursor is secure against removal when the slide is between the side bars.

2. The slide rule of claim 1 wherein the cursor including both said tongues is integral throughout.

WILFRED J. BOOS.

REFERENCES CITED

The following references are of record in the file of this patent:

UNITED STATES PATENTS

| Number | Name | Date |
|---|---|---|
| 880,907 | Nickel | Mar. 3, 1908 |
| 1,181,672 | Keuffel | May 2, 1916 |
| 2,170,144 | Kells et al. | Aug. 22, 1939 |
| 2,405,720 | Snedaker | Aug. 13, 1946 |
| 2,435,133 | Durand | Jan. 27, 1948 |